Figure 1:
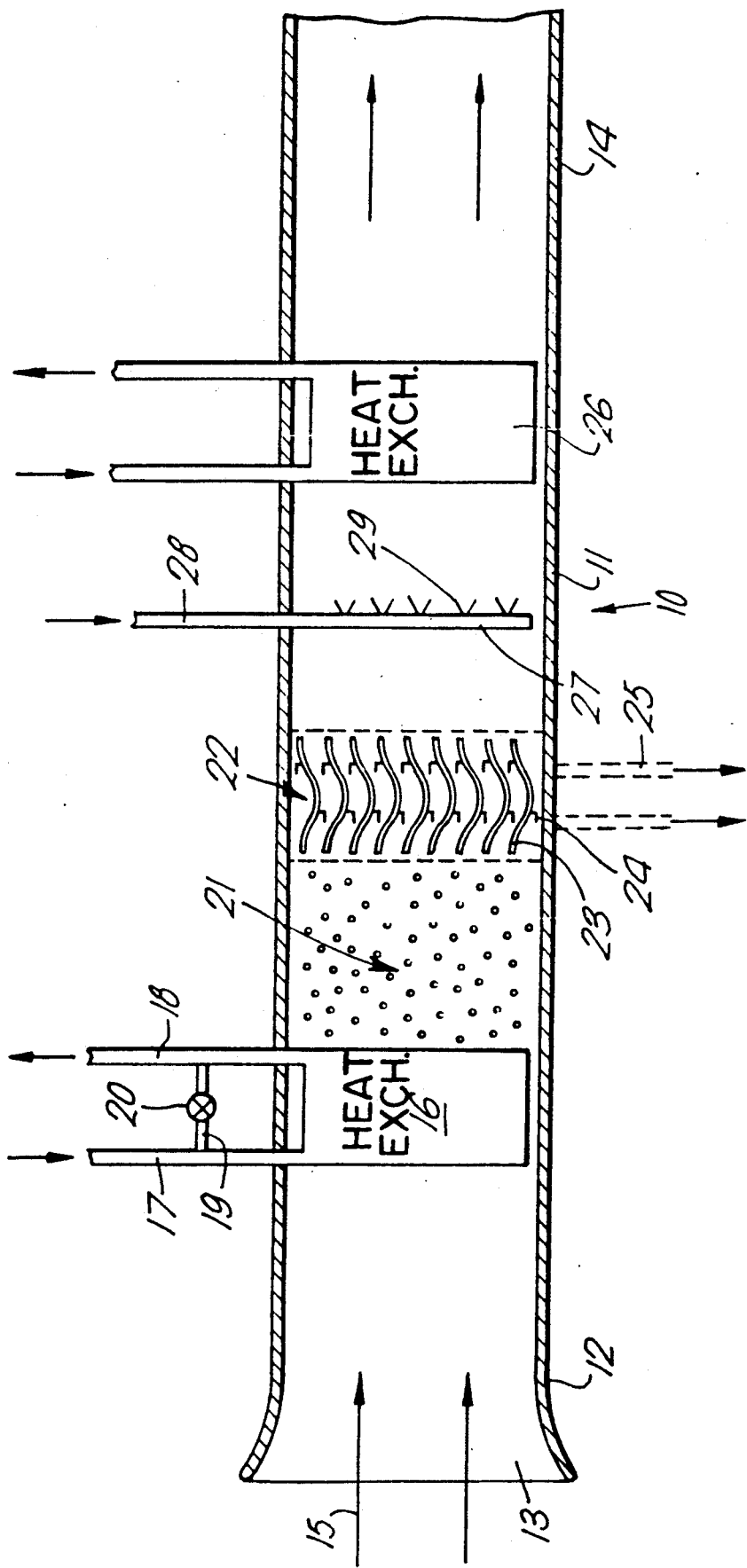

United States Patent [19]

Scott-Scott et al.

[11] Patent Number: 5,088,280
[45] Date of Patent: Feb. 18, 1992

[54] PREVENTION OF ICING IN THE INTAKES OF AEROSPACE PROPULSORS

[75] Inventors: John L. Scott-Scott, Warwick; Bryan L. Belcher, Leamington Spa; Alan Bond, Oxford, all of England

[73] Assignee: Rolls-Royce plc, London, England

[21] Appl. No.: 314,701

[22] Filed: Feb. 17, 1989

[30] Foreign Application Priority Data

Mar. 23, 1988 [GB] United Kingdom ............... 8806886

[51] Int. Cl.⁵ .................................................. F02K 9/00
[52] U.S. Cl. ..................... 60/257; 60/270.1; 60/267; 62/52.1; 62/12
[58] Field of Search ............... 60/246, 266, 267, 257, 60/269, 270.1, 39.093; 62/14, 12, 52.1

[56] References Cited

U.S. PATENT DOCUMENTS

| | | | |
|---|---|---|---|
| 2,920,448 | 1/1960 | Coanda | 60/267 |
| 3,040,519 | 6/1962 | Rae | 60/260 |
| 3,557,557 | 1/1971 | Prachar | 62/14 |
| 3,561,217 | 2/1971 | Hall | 60/260 |
| 3,775,977 | 12/1973 | Builder et al. | 60/260 |
| 4,771,601 | 4/1988 | Spies | 60/260 |
| 4,782,655 | 11/1988 | Weber | 60/260 |
| 4,893,471 | 1/1990 | Huling | 60/257 |
| 5,025,623 | 6/1991 | Hirakoso et al. | 60/257 |

FOREIGN PATENT DOCUMENTS 59180759 8/1986 Japan .

*Primary Examiner*—Michael J. Carone
*Attorney, Agent, or Firm*—Cushman, Darby & Cushman

[57] ABSTRACT

An air intake suitable for an aerospace propulsor comprises a duct which contains, in flow series, a first heat exchanger, a water separator, and a cryogen injector and a second heat exchanger. Air entering the intake is cooled by the first heat exchanger to cause the majority of the water vapor in the air to condense into water droplet form. The water droplets are then removed by the air flow by the water separator. The cryogenic injector reduces the air flow temperatures still further so that any remaining water in the air flow is converted to small dry ice crystals which do not block the second heat exchanger.

11 Claims, 2 Drawing Sheets

PREVENTION OF ICING IN THE INTAKES OF AEROSPACE PROPULSORS

This invention relates to the prevention of icing in the intakes of aerospace propulsors and has particular reference to intakes suitable for use with the type of aerospace propulsor disclosed in UK patent application number 8430157.

A common method of preventing icing in the region of the intake of a gas turbine engine is to take hot air from a suitable stage of the engine compressor, and to use that air to preheat the appropriate components in the intake region, eg, struts and inlet guide vanes. This technique is used for engine operation at low altitudes where the ice-forming water is in the form of supercooled droplets or very cold vapour which cause coalescence.

At high altitudes, ice can still be encountered but usually in a less hazardous form. Thus in such situations, crystallisation has already occurred and the ice is in the form of a "dust" of very cold, very dry crystals. The crystals can collide with each other and with metal surfaces without coalescence and hence pass through the intake region of the engine.

In the case of a conventional aero gas turbine engine compressor, there is a point in the compressor process where the crystals sublime and become water vapour. As far as in known, this process is not harmful to compressor components.

In thermodynamic terms, the process is beneficial since its effects are similar to those of a compressor intercooler by virtue of the associated latent heat transfer process. Thus if the water vapour can be turned into fine, dry ice crystals, then the passage of these crystals through an engine is possible without accretion or coalescence.

The propulsor described and claimed in UK patent application number 8430157 includes a low pressure compressor which receives air via two heat exchanges arranged in series. Both heat exchanges receive coolant in the form of high pressure liquid hydrogen. The coolant flows are used to cool the low pressure compressor inlet air to a temperature which is appropriate for the efficient operation of the engine.

In certain regions of the flight envelope of the propulsor outlined above, warm, moisture laden air can be cooled in the heat exchangers to a level at which there may be a considerable accretion of ice on the heat exchangers, particularly the upstream heat exchanger. Indeed in a very short time interval, the ice build-up can be so severe that the effective operation of the propulsor is compromised.

The air compression system of the propulsor cannot be used to provide any means of heating since, even though the compression process increases the air temperature, that temperature is still likely to be below 0° C., and at the outlet from the low pressure compressor, the air temperature will be considerably below 0° C.

It is an object of the present invention to provide an aerospace propulsor air intake having at least one heat exchanger system in which the accretion of ice within the intake is substantially avoided.

According to the present invention, an air intake suitable for an aerospace propulsor comprises a duct having an upstream end for receiving an air flow and a downstream end for delivering said air flow to said propulsor, said duct containing, in flow series relationship, a heat exchanger, and a cryogen injector, said heat exchanger being adapted to place said air flow through said duct in heat exchange relationship with a fluid, the temperature of which fluid is in operation arranged to be lower than that of said air flow upstream of said heat exchanger, said heat exchanger being so arranged that said heat exchanger fluid reduces the temperature of said air flow sufficiently to cause the majority of any water vapour in said air flow through said heat exchanger to condense into liquid droplet form, said cryogen injectior being adapted to operationally direct a cryogen into said air flow to provide the conversion of water in said air flow downstream of said separator into discrete dry, ice particles.

The invention will now be described, by way of example, with reference to the accompanying drawings in which FIG. 1 is a schematic sectional side view of an aerospace propulsor air intake in accordance with the present invention.

Figure 2:
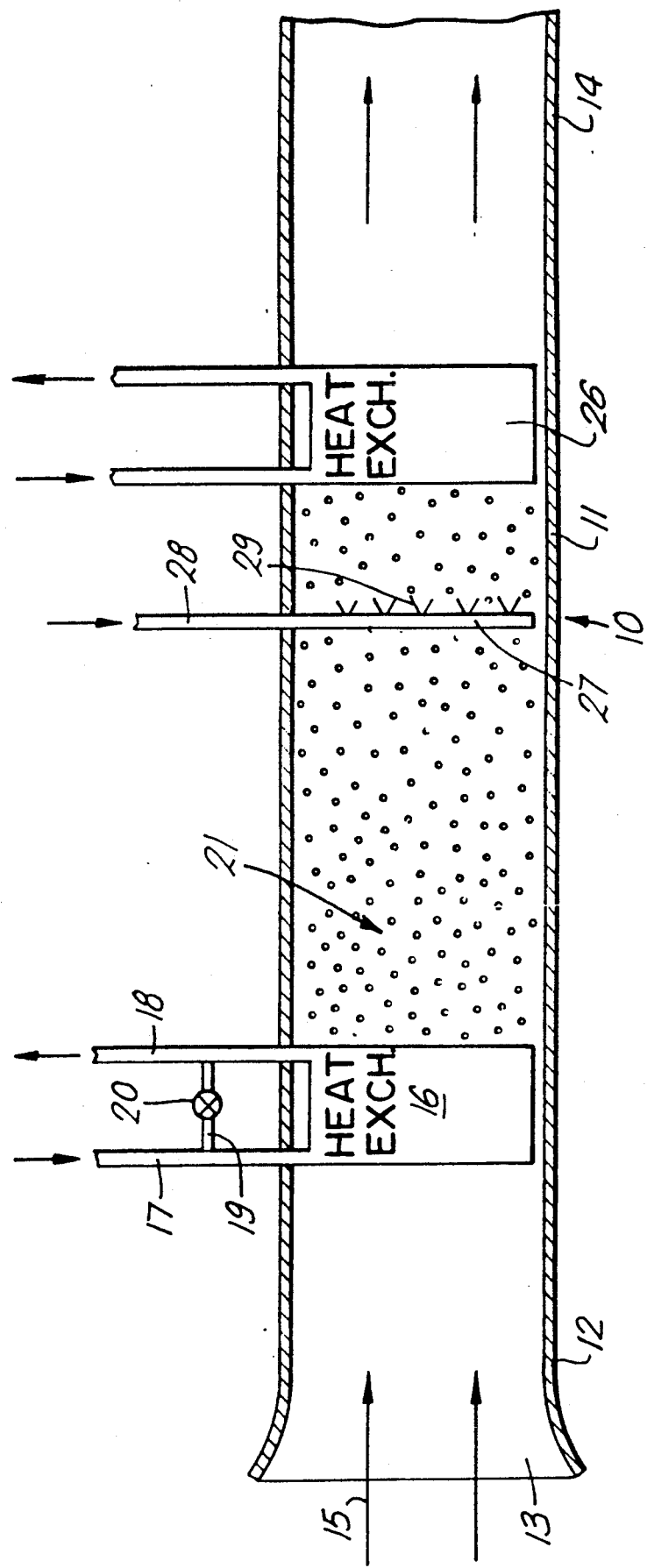

FIG. 2 is a similar view of an alternative form of an aerospace propulsor air intake in accordance with the present invention.

With reference to FIG. 1, an air intake generally indicated at 10 is suitable for use with an aerospace propulsor of the type described in UK patent application no 8430157. The intake 10 comprises a duct 11 having an upstream end 12 at which is located an air inlet 13, and a downstream end 14 which delivers the air flow through the intake 10 to an aerospace propulsor (not shown).

In operation, ambient air enters the duct 11 through the air inlet 13 as indicated by the arrows 15 whereupon it passes through a heat exchanger 16. The heat exchanger 16 receives a flow of liquid hydrogen through a supply duct 17 and places that liquid hydrogen in heat exchange relationship with the air flow through the duct 11. The hydrogen is then exhausted from the heat exchanger 16 via an outlet duct 18. The heat exchanger inlet and outlet ducts 17 and 18 are interconnected by a cross-over duct 19 having a flow control valve 20. The flow control valve 20 and the temperature of the liquid hydrogen fed into the heat exchanger 16 are so arranged that the flow of liquid hydrogen through the heat exchanger 16 is sufficient to reduce the temperature of the air flowing through the heat exchanger 16 to a level at which the majority of water vapour in the air condenses in the form of liquid droplets. Thus in a typical situation in which the ambient air temperature is 30° and the liquid hydrogen fed into the heat exchanger 16 is at a temperature of between $-10°$ C. and $-16°$ C., the air flow is cooled down to a value of between 5° C. and 15° C., the lower value being preferable. In such circumstances, the temperature of the hydrogen exhausted from the heat exchanger 16 is in the region of 4° C. These values assume ice having a temperature of 0° C. at ground level. However, in more general terms, the heat exchanger 16 should cool the air flow to a temperature between the saturation temperature of the air at the local conditions of the air inlet 13 and approximately 15° C. above that temperature.

The degree of air cooling provided by the heat exchanger 16 is critical in that if insufficient cooling is provided, inadequate condensation occurs whereas if excessive cooling is provided, the heat exchanger 16 freezes the condensed water vapour and eventually becomes blocked through ice accretion thereon.

In the aerospace propulsor described in UK patent application number 8430157, there are provided two heat exchangers adapted for liquid hydrogen flow situated upstream of the air inlet of the propulsor. In the application of the air intake of the present invention to the aerospace propulsor described in UK patent application 8430157, one of the heat exchangers of that propulsor, in particular the upstream heat exchangers, could be conveniently arranged to be the heat exchanger 16.

The air flow emerging from the heat exchanger 16 carries the water droplets 21 resulting from the water vapour condensation within the heat exchanger 16. The air temperature at this point is between 5° C. and 13° C. and so the droplets are in liquid form.

Downstream of the heat exchanger 16 there is located a water separator 22. The separator 22, which is shown in schematic form, comprises a plurality of plates 23 which are of generally sinuous form. The sinuous shape of each of the plates 23 ensures that as the water droplet-laden air passes through the separator 22, the droplets impinge and coalesce upon the plates 22. The coalesced water then proceeds to flow along the plates 23 until it encounters a gutter 24, two being provided on each of the plates 23. The gutters 24 collect the water and direct it into drain pipes 25 which in turn direct the water out of the duct 11.

Although a sinuous plate type of water separator 22 is utilised on the present embodiment of the invention, it will be appreciated that other suitable types of separator could be utilised if so desired.

The separator 22 serves to remove the majority of the water carried by the air flow through the duct 11. However, downstream of the separator 22 there is provided a second heat exchanger 26 which, like the first heat exchanger 26, puts liquid hydrogen in exchange relationship with the air flow through the duct 11. The second heat exchanger 26, which corresponds with the second of the heat exchangers situated upstream of the air inlet of the propulsor described in UK patent application 8430157, cools the air flow to a temperature at which any water in the air flow would freeze within the heat exchanger 26 and thereby block it. In order to prevent this happening, there is provided upstream of the second heat exchanger 26, a cryogen injector 27. The injector 27 is provided with a supply of a cryogen, which in the present case is liquid oxygen, through a supply pipe 28. A plurality of nozzles 29 provided on the injector 27 direct the liquid oxygen into the air flow through the duct 11 where it serves to reduce the air temperature to a temperature in the region of at least −50° C. This rapid reduction in air temperature causes any remaining water in the air flow to rapidly crystallise into small dry ice crystals which are sufficiently small to pass through the matrix of the second heat exchanger 26 without melting on impact.

Melting an impact is termed "regelation" and occurs if the kinetic energy of the ice crystals is greater than the heat required to raise the temperature of the ice to 0° C. and also cause some local melting at the points of impact of the ice crystals. We have found that if the air temperature resulting from the cryogen injection is above −50° C. some regelation is still possible and therefore there remains the danger that the heat exchanger 26 could become blocked with ice. At temperatures below −50° C., there is a satisfactory degree of formation of the desirable small dry ice crystals.

Liquid oxygen is the preferred cryogen for injection into the air flow through the duct 11, in view of the enrichment it provides to the air supply of the aerospace propulsor. It will be appreciated however that other suitable cryogens could be utilised if so desired.

It is inevitable that some of the small dry ice crystals entering the second heat exchanger 26 will impact upon stagnation zones within the heat exchanger 26. However as long as the heat exchanger 26 is functioning normally, that is with coolant passing through it, then those ice crystals which do settle within the heat exchanger suffer from a form of thermal stress and aerodynamic drag and are eventually shed in a periodic manner.

As previously stated, both of the first and second heat exchangers 16 and 26 are fed with liquid hydrogen. It will be appreciated however that other suitable coolants such as liquid methane could be used if so desired. Moreover although the first and second heat exchangers 16 and 26 are described as being provided with separate supplies of liquid hydrogen, it may be convenient in certain circumstances to direct the hydrogen exhausted from the second heat exchanger 26 into the first heat exchanger 16 since the second heat exchanger 26 normally operate at a lower temperature than the first heat exchanger 16.

If the propulsor provided with an air intake in accordance with the present invention is required to operate in geographical locations in which the atmosphere has a low humidity level, it may be possible to dispense with the water separator 22. Such an air intake is depicted in FIG. 2 common reference numerals being used for common items. Thus any water vapour in the atmosphere will still be condensed by the heat exchanger 16 as in the embodiment of FIG. 1. However the flow rate of liquid oxygen through the injector 27 is controlled so as to ensure that the condensed water droplets 21 are rapidly crystalised into small dry ice crystals which are, as previously described, sufficiently small to pass through the matrix of the second heat exchanger.

We claim:

1. An air intake suitable for an aerospace propulsor comprising a duct having an upstream end for receiving an air flow and a downstream end of delivering said air flow to said propulsor, said duct containing, in flow series relationship, a heat exchanger, and a cryogen injector, said heat exchanger being adapted to place said air flow through said duct in heat exchange relationship with a fluid, the temperature of which fluid is in operation arranged to be lower than that of said air flow upstream of said heat exchanger, said heat exchanger being so arranged that said heat exchanger fluid reduces the temperature of said air flow sufficiently to cause the majority of any water vapour in said air flow through said heat exchanger to condense into liquid droplet form, said cryogen injector being adapted to operationally direct a cryogen into said air flow to provide the conversion of water in said air flow into discreet dry ice particles.

2. An air intake as claimed in claim 1 wherein said duct additionally contains a water separator positioned downstream of said heat exchanger and upstream of said cryogen injector, said water separator being adapted to remove the majority of said water droplets from said air flow.

3. An air intake as claimed in claim 1 wherein said heat exchanger is so adapted that it operationally reduces the temperature of said air flow to a value between the saturation temperature of said air at the local conditions of the upstream end of said duct and approximately 15° C. above that temperature.

4. An air intake as claimed in claim 3 wherein said heat exchanger reduces the temperature of said air flow to a value between 5° C. and 13° C.

5. An air intake as claimed in claim 1 wherein means are provided to vary the flow rate of said low temperature fluid operationally flowing through said heat exchanger and placed by said heat exchanger in heat exchange relationship with said air flow.

6. An air intake as claimed in claim 1 wherein said cryogen operationally injected in to said air flow reduces the temperature of said air flow to at least −50° C.

7. An air intake as claimed in claim 2 wherein said water separator comprises a plurality of sinuous plates which are so arranged and configured that said water droplets impinge and condense thereupon, each of said sinuous plates being provided with gutter members which members are adapted to collect said condensed water and to direct said water to means adapted to drain it from said duct.

8. An air intake as claimed in claim 1 wherein a second heat exchanger is situated in said duct downstream of said cryogen injector, said second heat exchanger being operationally adapted to be supplied with a fluid which further reduces the temperature of said air flow prior to said air flow being exhausted from the downstream end of said duct.

9. An air intake as claimed in claim 8 wherein said second heat exchanger is connected in flow series relationship with said first heat exchanger so that low temperature fluid exhausted from said second heat exchanger is directed into the inlet of said first heat exchanger so that said low temperature fluid is twice placed in heat exchange relationship with the air flow operationally flowing through said duct.

10. An air intake as claimed in claim 1 wherein said heat exchanger fluid is hydrogen.

11. An air intake is claimed in claim 1 wherein said cryogen operationally injected into said air flow is liquid oxygen.

* * * * *